(12) United States Patent
Koslow

(10) Patent No.: US 9,352,333 B2
(45) Date of Patent: May 31, 2016

(54) METHOD AND DEVICE FOR SEPARATING ALL NONMAGNETIC COMPONENTS FROM A MIXTURE OF SCRAP METAL IN ORDER TO OBTAIN PURE SCRAP IRON

(71) Applicant: Alexander Koslow, Landshut (DE)

(72) Inventor: Alexander Koslow, Landshut (DE)

(73) Assignee: AKAI GmbH & Co. KG, Kolbermoor (DE)

( * ) Notice: Subject to any disclaimer, the term of this patent is extended or adjusted under 35 U.S.C. 154(b) by 0 days.

(21) Appl. No.: 14/449,905

(22) Filed: Aug. 1, 2014

(65) Prior Publication Data

US 2014/0339138 A1 Nov. 20, 2014

Related U.S. Application Data

(63) Continuation of application No. PCT/IB2012/000502, filed on Mar. 15, 2012.

(30) Foreign Application Priority Data

Feb. 9, 2012 (DE) .......................... 10 2012 002 528

(51) Int. Cl.
*B03C 1/22* (2006.01)
*B03C 1/033* (2006.01)
*B03C 1/30* (2006.01)

(52) U.S. Cl.
CPC ................ *B03C 1/22* (2013.01); *B03C 1/0332* (2013.01); *B03C 1/0335* (2013.01); *B03C 1/30* (2013.01); *B03C 2201/20* (2013.01); *B03C 2201/22* (2013.01)

(58) Field of Classification Search
CPC ...... B03C 1/0332; B03C 1/0335; B03C 1/16; B03C 1/22; B03C 1/30

USPC ................ 209/214, 223.1, 225, 228
See application file for complete search history.

(56) References Cited

U.S. PATENT DOCUMENTS 2,003,430 A * 6/1935 Crockett ...................... 209/232
2,470,889 A 5/1949 Drescher
(Continued)

FOREIGN PATENT DOCUMENTS

DE 52411 C 7/1890
DE 311387 C 3/1919
(Continued)

OTHER PUBLICATIONS

English Translation of JP 2005349321 A; Yasuhiro et al.; Published Dec. 2005.*

(Continued)

*Primary Examiner* — Joseph C Rodriguez
(74) *Attorney, Agent, or Firm* — St. Onge Steward Johnston & Reens, LLC

(57) ABSTRACT

A process and a device for dry separation of a conglomerate of metal scrap of non-magnetic particles from magnetic ones. Dry separation equipment for metal scrap which have a sequence of magnets placed in line, the poles of which are north-pole to south-pole are unable to meet this requirement. This insufficiency is due to the fact that the conglomerate of metal scrap is not sufficiently shook. This procedure does mean that at the end of transportation there is still non-magnetic material and other stuff fixed to the magnetic material. Intensive motion necessary is achieved by this invention by locating magnets adjacent to one another with equal poles, north-pole to north-pole and south-pole to south-pole and so on.

7 Claims, 1 Drawing Sheet

(56) References Cited

U.S. PATENT DOCUMENTS

| | | | | |
|---|---|---|---|---|
| 3,784,945 A | * | 1/1974 | Baermann | 335/302 |
| 3,809,239 A | * | 5/1974 | Barrett et al. | 209/636 |
| 3,901,795 A | * | 8/1975 | Smith et al. | 209/39 |
| 3,935,947 A | | 2/1976 | Barrett | |
| 3,985,647 A | * | 10/1976 | Smith | 209/218 |
| 4,125,191 A | * | 11/1978 | Peace | 209/636 |
| 4,214,984 A | | 7/1980 | MacElvain | |
| 4,337,900 A | * | 7/1982 | Williams et al. | 241/14 |
| 4,686,034 A | * | 8/1987 | Barrett | 209/223.1 |
| 4,738,367 A | * | 4/1988 | Barrett | 209/223.1 |
| 4,781,821 A | * | 11/1988 | Salmi | 209/214 |
| 5,043,063 A | * | 8/1991 | Latimer | B03C 1/284 210/222 |
| 5,234,171 A | * | 8/1993 | Fantacci | 241/24.14 |
| 5,341,937 A | * | 8/1994 | Vos | 209/38 |
| 5,797,498 A | * | 8/1998 | Kobayashi et al. | 209/636 |
| 7,134,555 B2 | * | 11/2006 | Wise | 209/213 |
| 7,210,581 B2 | * | 5/2007 | Robinson | B03C 1/00 209/221 |
| 7,438,190 B2 | * | 10/2008 | Wise | 209/232 |
| 8,955,686 B2 | * | 2/2015 | Rhodes | B03C 1/02 209/217 |

FOREIGN PATENT DOCUMENTS

| | | |
|---|---|---|
| DE | 102008047852 A1 | 4/2010 |
| DE | 202011100997 U1 | 8/2011 |
| GB | 1000245 A | 8/1965 |
| GB | 1594216 A | 7/1981 |
| JP | S50124257 A | 9/1975 |
| JP | 2005349321 A | 12/2005 |
| JP | 2011104583 A | 6/2011 |
| WO | 0240170 A2 | 5/2002 |

OTHER PUBLICATIONS

International Search Report Application No. PCT/IB2012/000502 Completed: Nov. 21, 2002; Mailing Date: Nov. 29, 2012 3 pages.

* cited by examiner

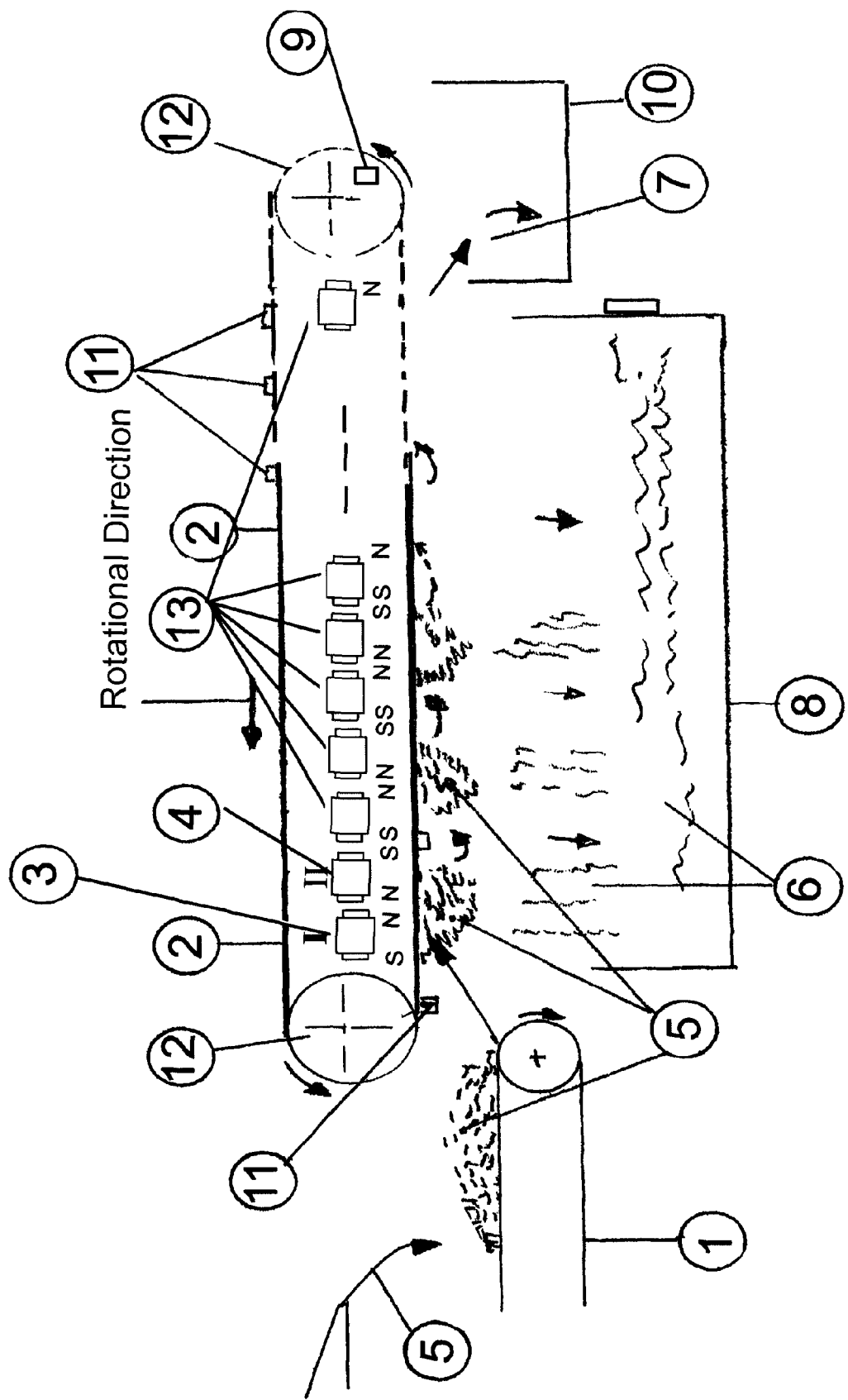

METHOD AND DEVICE FOR SEPARATING ALL NONMAGNETIC COMPONENTS FROM A MIXTURE OF SCRAP METAL IN ORDER TO OBTAIN PURE SCRAP IRON

FIELD OF THE INVENTION

A method and device for separating nonmagnetic components from a mixture of scrap metal in order to obtain pure scrap iron.

BACKGROUND OF THE INVENTION

It is known by the state of art to use a so called magnet separator for separation of magnetic material from non-magnetic particles out of a conglomerate of metal scrap. Such a one dimensional process does not any more meet the requirements of today to produce quality-steel from scrap. On the contrary, scrap which should be smelt again must consist of pure magnetic material.

Conglomerates of metal scrap are normally delivered by the industry as waste and contain magnetic and non-magnetic particles as well as other residues. Since interest for further treatment is focused solely on pure metals of one type, e.g. magnetic particles as iron or non-magnetic particles as cooper, recycling enterprises are charged with the task to separate such conglomerates into each component in accordance with their individual material related characteristics. This creates significant problems since individual components of materials contained in the conglomerate are often attached together by adhesive forces to such an extent or by loose connection that a normal magnet sorter cannot clearly separate magnetic from non-magnetic components.

Small non-magnetic particles mostly are still combined with magnetic particles or combined by adhesion and enter together with magnetic parts to a follow-up melting process. Steel obtained from such a material composition does not meet the existing standards for high quality steel since steel quality suffers from such a mixture of different components. In order to meet the standards for high quality steel requested today, scrap released for melting must consist of pure iron and is not allowed to contain non-magnetic particles as cooper, not even in the form of cooper dust.

A clear separation of magnetic and non-magnetic material components is one objective of this invention.

Until now for such separation so called magnet sorters were used. Such magnet separators consist of a conveyer belt of non-magnetic material above which magnets are placed. That apparatus is fed by a conglomerate consisting of metal scrap that contains differing components of metal. Magnets attract magnetic particles and allow only part of the non-magnetic particles to fall into a collection container for residues. This kind of separation of magnetic particles contained in a conglomerate of metal is not sufficient since non-magnetic particles still adhere to magnetic particles in a loose way.

A known embodiment recommends for such handling to transport a conglomerate of metal scrap by using a conveyer belt, the belt of which is guided at both ends across deflection pulleys. In the space between the upper trunk and lower trunk of the conveyer belt close to the lower part of the conveyer belt magnets are arranged in a row one following the next one. These magnets may be activated and deactivated intermittingly. This known dry separating machine for non-magnetic particles out of a conglomerate of metal scrap does not meet anymore the existing requirements. That conglomerate of metal scrap is guided along a row of magnets, nonetheless the conglomerate of metal scrap is not sufficiently kept in motion along the conveyer belt (DE Patent specification 311 387), to enable separation of magnetic particles from non-magnetic particles, even though additional means may be attached to the conveyer belt. Pole orientation at this known embodiment is chosen in the following way that a south pole is subsequently followed by a north pole and so on. In this way a permanent change between south and north pole no real motion is achieved, however such a change in pole direction does not result in sufficiently needed motion to separate a conglomerate of metal scrap. Such an orientation of magnets north-south only creates an insufficient motion of the conglomerate of metal scrap transported by the conveyer belt, if any motion at all is reached.

SUMMARY OF THE INVENTION

This is one objective of this invention to solve that problem. Following the process according to my invention, motion along the conveyer belt is intensified by choosing a placing of the magnets in the following way: a north pole is followed by a north pole and a south pole is followed by a south pole. That arrangement means that a north pole is always followed by a north pole and a south pole is followed by a south pole and so on. This magnet arrangement results in the fact that the material at the conveyer belt is permanently in a rotating and shaking motion in order to separate all non-magnetic particles. The number of magnets placed above the conveyer belt in a row depends from the grade of a desired extent of cleanness that means the more magnets are arranged in a row the better is the achieved level of purity.

In order to enable the effect of magnet forces to achieve their full power, technical means are provided for dressing the conglomerate of metals prior to feeding it on the conveyor belt of a magnetic separator, e.g. to homogenize to seize by using a shredder or hammer mill. In order to support transportation and motion the belt of the magnetic sorter may be equipped on the side of the belt on which material is fed with a kind of naps, hucksters or transportation supporting strips. Designed in such a manner the conglomerate of metals will be attracted by magnetic forces to that side of the belt which is opposite to the placing of the magnets, pulled away and additional motion is stimulated. For this purpose naps are designed and placed in a variable way and positioned all over the complete width of the conveyer belt.

It is important to keep the conglomerate of scrap permanently in intensive motion in order to make non-magnetic particles separating from magnetic ones. Since material attracted by the first magnet contains besides magnetic particles still non-magnetic ones that are attached to the magnetic particles or loosely combined with them, such material will be transported further downstream out of the range of the first magnet by naps on the conveyer belt and so taken to the range of influence of the follow-up magnet.

Even when for intensifying motion on the conveyer belt alternating poling of the magnets has been chosen, it is essential that poles of adjacent magnets must be identical, that does mean north pole to north pole and south pole to south pole. This pole orientation creates the motion wanted and results in the fact that non-magnetic material detaches from magnetic material and makes them fall down. This process will be repeated as often as necessary for achieving pure iron free of non-magnetic particles.

Magnets of the permanent type can be used as well as electrical magnets. Electrical magnets adjacent in row to one-another have the advantage in relation to permanent magnets that a control device may deactivate a magnet up-stream and at the same time activate a magnet that is adjacent next downstream and vice-versa. That facilitates transferring from one magnet to the following one since adhesion forces vary and non-magnetic particles more easily detach from magnetic ones. Non-magnetic particles detach more easily from magnetic particles that already have passed a first separation process. This process may be repeated as often as necessary for achieving purified iron, which means iron free of any components of non-magnetic material.

A further development includes attaching to the magnets vibration producing elements in order to keep material already attached to a magnet in intensive motion in order to enable non-magnetic material to separate.

The pulleys at the ends of the conveyer belt may as well be equipped with vibration devices, in order to keep the total conveyer belt in motion to facilitate separation of non-magnetic particles from magnetic ones.

In addition or separately, separation from non-magnetic particles of a conglomerate of metal scrap may be supported by treating the conglomerate with a gas stream, e.g. airstream or stream of a liquid preferably also under pressure, e.g. water-shower with or without added chemical components, thus liberating magnetic particles as part of the conglomerate from non-magnetic particles.

All these additional measures may be used separately or combined with others in order to achieve an optimal situation for separation of magnetic particles from non-magnetic materials.

BRIEF DESCRIPTION OF THE DRAWINGS

FIG. 1 is a diagram of one embodiment of a device for separating non-magnetic components according to the present teachings.

DETAILED DESCRIPTION OF THE INVENTION

Referring to FIG. 1, a conveyer belt (1) transports a conglomerate of metal scrap, comminuted by a shredder or hammer mill, into the magnetic field of a first magnet of a rotating with magnets operating dispositive. The magnet of the first magnetic block I (3) attracts the conglomerate of metallic scrap (5) that is carried on a non-magnetic transportation belt (2) underneath of magnets arranged in row in direction of transport.

Detachable non-magnetic material (6) easily falls down into a collection bin (8). The non-magnetic transportation belt (2) possesses on the side showing to the conglomerate of metal scrap (5) naps (11) or humps (11), however may only possess a rough surface in order to improve transportation of metal scrap (5) and to take it from a preceding magnet I to the next following magnet block II.

When transporting conglomerate of metal scrap from a preceding magnet block I to the next following magnet block II the conglomerate of metal scrap shortly is unsettled, that enables non-magnetic material to get off from magnetic materials and to fall into a collection bin. This process can only occur if the relation of the poles from successively following magnets I chosen in such a way, that a north-pole is followed by a north-pole and a south-pole is followed by another south-pole. This process is as often as necessary repeated to purify magnetic material from non-magnetic stuff.

The number (n) of successively following magnet-blocks (m) is only guided by the desired level of purity of the magnetic materials. The non-magnetic transportation belt (2) runs at both ends over rotary wheels (pulleys) (12) one of them may at least be equipped with an electrical drive, the revolution of which may be controlled. Driving forces transmitted to the non-magnetic belt originate at least from an electrical drive. In order to further improve separation of non-magnetic stuff from magnetic material the magnet blocks (m) are equipped with vibration elements (9).

BIBLIOGRAPHIC DATA

1 Conveyer belt
2 Transportation facility
3 Magnet block I
4 Magnet block II
5 Conglomerate of metal scrap
6 Non-magnetic material
7 Scrap of iron (purified)
8 Collection bin
9 Vibration device
10 Collection bin for iron
11 Naps and further humps
12 Pulleys

What is claimed is:

1. A device for dry purifying of a conglomerate of metal scrap from non-magnetic stuff comprising:
a conveyer belt; and
a plurality of magnets arranged in a row over the conveyer belt;
wherein the conveyer belt is configured to transport comminuted metal scrap along the plurality of magnets in a transportation direction of the conveyer belt; and
wherein a side of the conveyer belt facing the comminuted metal scrap is rugged;
characterized in that
poles of each magnet of the plurality of magnets are arranged such that a north-pole of each magnet is followed by a north-pole of a next magnet of the plurality of magnets and a south-pole of each magnet is followed by a south-pole of the next magnet, wherein the next magnet is the magnet of the plurality of magnets adjacent to each magnet in the transportation direction.

2. The device according to claim 1, wherein the side of the conveyer belt facing the comminuted metal scrap is rugged by equipping the side with napes or humps.

3. The device according to claim 1, wherein the conveyer belt runs at both ends over pulleys, and wherein the pulleys are equipped with an electrical drive.

4. The device according to claim 1, wherein each magnet of the plurality of magnets is an electrical magnet, and wherein the device further comprises an electrical control device which controls the activation of the magnets in a way that when a preceding magnet is inactive the next following magnet is activated.

5. The device according to claim 1, wherein the conveyer belt is guided at both ends by at least two guide rollers, one of them is at least transmitting driving forces to the conveyer belt delivered by a controllable electrical drive and that in addition is equipped with a vibration installation in order to vibrate the whole conveyer belt.

6. The device according to claim 1, further comprising nozzles, the openings of which are directed towards the plurality of magnets, and which blow a gas or liquid stream under pressure towards the comminuted metal scrap, in order to blow off or wash out non-magnetic particles which adhere to the comminuted metal scrap.

7. The device according to claim 1, further comprising at least one vibration element.

* * * * *